United States Patent
Ottleben et al.

(10) Patent No.: US 8,803,065 B2
(45) Date of Patent: Aug. 12, 2014

(54) LIGHT BARRIER AND METHOD FOR PULSED OPERATION IN WHICH THE INCIDENCE OF EXTRANEOUS LIGHT ON THE DETECTOR CAN BE DETECTED AND COMPENSATED FOR

(75) Inventors: Bernd Ottleben, Bad Salzdetfurth (DE); Bernward Mock, Hildesheim (DE); Petra Ottleben, Bad Salzdetfurth (DE)

(73) Assignee: Pantron Instruments GmbH, Bad Salzdetfurth (DE)

( * ) Notice: Subject to any disclaimer, the term of this patent is extended or adjusted under 35 U.S.C. 154(b) by 396 days.

(21) Appl. No.: 13/174,876

(22) Filed: Jul. 1, 2011

(65) Prior Publication Data

US 2012/0001062 A1 Jan. 5, 2012

(30) Foreign Application Priority Data

Jul. 2, 2010 (DE) .......................... 10 2010 025 929

(51) Int. Cl.
*G01J 1/44* (2006.01)
*H05B 37/02* (2006.01)
*H05B 39/04* (2006.01)

(52) U.S. Cl.
USPC .................... 250/214 AL; 250/221; 340/555

(58) Field of Classification Search
USPC ............ 250/214 AL, 216, 221; 340/555–557
See application file for complete search history.

(56) References Cited

U.S. PATENT DOCUMENTS 7,613,399 B2 * 11/2009 Yasumoto et al. ............ 398/154
2007/0132734 A1 * 6/2007 Kwak et al. .................... 345/166

FOREIGN PATENT DOCUMENTS

| DE | 42 37 311 | 12/1993 |
| DE | 43 19 451 | 8/1994 |
| DE | 10 2008 004 025 | 10/2008 |
| DE | 10 2009 005 991 | 7/2010 |
| EP | 0 875 771 | 11/1998 |
| EP | 1 174 733 | 1/2002 |

* cited by examiner

*Primary Examiner* — Francis M Legasse, Jr.
(74) *Attorney, Agent, or Firm* — Whitham Curtis Christofferson & Cook, PC

(57) ABSTRACT

Pulsed operation of a light barrier that can be operated in a normal mode and in a compensation mode includes repeating a cycle of transmitting electromagnetic radiation over a transmission period recording measured radiation values at various measurement times and establishing whether extraneous light is incident on the detector by examining a measured value curve of the recorded measured radiation values. The respectively next cycle in the normal mode being run through when no extraneous light is incident, and in the compensation mode when extraneous light is incident, at least one compensation measure being carried out in the compensation mode in order to compensate the influence of extraneous light.

9 Claims, 4 Drawing Sheets

LIGHT BARRIER AND METHOD FOR PULSED OPERATION IN WHICH THE INCIDENCE OF EXTRANEOUS LIGHT ON THE DETECTOR CAN BE DETECTED AND COMPENSATED FOR

The invention relates to a method for pulsed operation of a light barrier and to a light barrier.

Light barriers are known today in numerous embodiments. They can be of different sizes and fulfill very different purposes. A field of application of light barriers that is given here by way of example is the detection of the contour of a motor vehicle inside a car wash. Particularly in the case of the drying of the vehicle, the contour is scanned in this case with the aid of light barriers arranged to move appropriately, in order to ensure drying with the lowest possible consumption of air and energy.

In principle, light barriers have an optical transmitter, for example an LED, and an optical receiver. This detector usually includes an optically sensitive component, for example a photodiode or a phototransistor.

In the case of these components, noise is dependent on the measured photocurrent which, in turn, is dependent on the incident light power. The noise power passed onto a downstream amplifier is therefore proportional to the incident light power.

In order to screen the detectors against the incidence of interfering daylight, use is made of optical filters, for example. However, a problem arises when, for example, sunlight with the infrared wavelengths contained therein impinges directly on the detector. This causes a sharp increase in the photocurrent, which is measured in the optically sensitive component, and therefore also in the noise associated therewith.

The increased DC component of the filter current can be disconnected in this case by appropriate circuits. However, the noise remains present and is superposed on the actual useful signal so that the signal-to-noise ratio is now substantially worsened.

Particularly in the case of very small useful signal amplitudes such as are usual, for example, with automatic light barriers, this leads to a weakening of the useful signal, even to a temporary complete extinction thereof. Unreliable switching performance and operational faults thereby result in the light barrier. Particularly in the case of very quickly occurring incidents of disturbing light, there is no possibility of counteracting the latter by increasing the transmitted power by means of normal automatic control. Operational faults can occur in the light barrier when the light conditions on the optically sensitive detector change very quickly, for example when sunlight is interrupted by rotating objects such as, for example, the rotating brushes of a car wash.

It is therefore the object of the present invention to present a light barrier and a method for operating it with which the incidence of extraneous light on the optically sensitive detector can be detected and quickly compensated.

The invention achieves the object set by a method for the pulsed operation of a light barrier that can be operated in a normal mode and in a compensation mode, there being run through repeatedly a cycle that comprises the following steps:
a) transmitting electromagnetic radiation over a transmission period $\Delta t_{transmit}$ by means of a transmission device,
b) recording measured radiation values $I_i$ of the electromagnetic radiation at various measurement times $t_{meas}$ within the measurement period $\Delta t_{transmit}$ by means of a detector, and
c) establishing whether extraneous light is incident on the detector by examining a measured value curve of the recorded measured radiation values, the respectively next cycle in the normal mode being run through when no extraneous light is incident, and in the compensation mode when extraneous light is incident, at least one compensation measure being carried out in the compensation mode in order to compensate the influence of extraneous light.

In the pulsed operation of a light barrier, the transmission device respectively transmits only in short transmission periods that are, for example 4 milliseconds. The incident light power is converted into a current or a voltage at the optically sensitive detector, for example the photodiode. This output voltage of the detector is advantageously set to zero at the beginning of the transmission period, in order to achieve reproducible results. Reproducible initial conditions are achieved thereby, and influence exerted by previous measurements is excluded.

In the course of the transmission period, the output voltage at the signal detector increases continuously and becomes saturated at a final value. In this case, the duration of the transmission period is advantageously tuned to the characteristic properties of the components used so that the voltage reaches its final value at the end of the transmission period. An analog measurement of the output voltage, for example via an AD converter, is then performed at the end of the transmission period. The measured value is then compared with a prescribed switching threshold, for example by means of software. If the measured voltage value lies above the switching threshold, the electromagnetic radiation was able to reach the detector without hindrance by the transmission device, and there is no obstacle in the light barrier. If the measured voltage value lies below the threshold value, it must be assumed that an obstacle is located in the light barrier.

If extraneous light, for example sunlight, now falls directly onto the detector, the noise component of the voltage signal is substantially increased, as already described. Owing to the increased receiver noise, the output voltage displays a ripple profile at the detector. At the end of the transmission period, at which the voltage that is subsequently compared with the prescribed switching threshold is measured, it can happen in this case that the output voltage to be measured lies below the switching threshold although there is no object present in the light barrier. The switching output would therefore switch off the process to be controlled although there would be no reason for this.

The filter time constant would need to be increased in order once again to achieve a smooth profile of the voltage curve at the output of the detector. However, this would mean that the voltage signal at the end of the transmission period might not yet have reached the final value. The switching threshold would then possibly not be exceeded, and the light barrier would lose in range. Alternatively, the transmission period could also be lengthened, although this would also increase the reaction time of the light barrier.

In order to prevent this, in the case of the inventive method the voltage at the output of the detector is not just measured once at the end of the transmission period. Rather, a plurality of measured radiation values are recorded at various measurement times within the measurement period. The measured value curve to be formed therefrom is subsequently examined as to whether extraneous light is incident. If this is the case, in the next cycle the light barrier is operated in the compensation mode in which at least one compensation measure is carried out in order to compensate the influence of the irradiated extraneous light. It is possible in this way to react quickly to extraneous light without having to accept the above-mentioned disadvantages.

It is advantageous to provide the light barrier with a plurality of transmission devices which are respectively assigned a detector. Each of these pairs of transmission device and detector forms an independent light barrier channel. It is customary to apply a time multiplex method in order to exclude mutual influence between the individual channels owing to scattered light. This means that all the channels must be processed successively in time so that the described cycle is also run through successively for each transmission device and the detector assigned to it. Each channel is active for the transmission period of 4 ms, however, in this case. Consequently, in each case it is only one transmission device and the associated detector that are active during this time.

The total reaction time of such a multichannel light barrier results from the prescribed channel evaluation time, which is the time available for filtering the evaluation voltage of the signal detector, and the number of channels provided. The channel evaluation time is essentially the transmission time in this case. If the aim is not to carry out only a single measurement up to the switching statement but, for example, to form an average over a plurality of pulses via measured values of the output voltage at the end of the evaluation period, the described total reaction time still has to be multiplied by the number of pulses included up to the switching statement.

From a practical point of view, it is advisable to keep the total reaction time of a light barrier constant. It follows therefrom that for a prescribed number of channels, that is to say a prescribed number of transmission devices and detectors, it is also necessary to keep the channel evaluation time, and therefore the transmission period, constant. In particular, these cannot simply be lengthened when problems occur. This is also no longer necessary with the inventive method, and so the total reaction time can be kept constant in a simple and reliable way when problems occur.

The measured value curve of the recorded measured values is advantageously examined for a positive curvature.

Given an undisturbed channel at the signal detector, the measured voltage increases monotonically over the transmission period. A ripple profile of the output voltage of the detector over the transmission period does not occur until the incidence of extraneous light and the resulting superposition of this undisturbed signal with a relatively large noise. Particularly in the second part of the transmission period, it is therefore possible to distinguish an undisturbed voltage profile from a voltage profile with extraneous light superposition by the presence of a positive curvature. The second derivative of the measured value curve can advantageously be formed when examining for a positive curvature. In particular, the following steps can be carried out in the examination:

c1) forming the measured value difference $v_i$ from in each case two measured radiation values $I_i$, $I_{i+1}$ that can be recorded at consecutive measurement times, c2) forming the difference $a_i$ from in each case two consecutive measured value differences $v_i$, $v_{i+1}$ c3) adding all the differences $a_i$ that are greater than zero to form a total A, and c4) comparing the total A with a predetermined limit value $A_{Limit}$.

Even in the case of an undisturbed channel, a noise that is superposed on the actual measurement signal occurs in the voltage profile in the signal detector. However, this has a considerably smaller amplitude than the noise which, as a result of incident extraneous light, is superposed on the actual measurement signal.

Apart from a constant factor, the difference $a_i$ that is calculated in method step c2) corresponds to the discrete second derivative of the measured value curve. If this difference is positive, there is thus a positive curvature at the point on the measured value curve. It is ensured by summing all these positive curvatures and comparing with a previously set limit value that the presence of incident extraneous light is not assumed upon each occurrence of a positive curvature, which can also occur, for example, owing to the low noise when the detector is undisturbed. Not until the total of all the positive curvatures exceeds the predetermined limit value is it assumed that extraneous light is incident so that a switchover is made to the compensation mode of the light barrier. The total of all the positive curvature values is a direct measure of the ripple, and thus of the level of the disturbance of the signal by a noise. Owing to the fact that the mathematical consideration of the second derivative of the curve is involved, neither the absolute position of the curve, that is to say the intensity of the measured signal, nor the monotonic rise at the start of the transmission time exerts an influence on the result.

A new measured value A for the ripple is produced for each passage of the cycle. In addition, it is also possible to form a sliding average of these ripples over a plurality of channel passes. Said average can also be used in order to form further compensation measures. This option is of interest for sporadically occurring disturbing light, in particular.

Before it reaches the detector, the electromagnetic radiation is advantageously filtered according to frequency and/or polarization and/or phase. By way of example, the modulated light, for example, infrared light, of fixed frequency can be emitted by the transmission device. If this infrared light strikes the detector, it is amplified and evaluated by the signal evaluating circuit. Only signals that correspond in frequency and phase with the transmitted signal are evaluated in this process. Influences owing to scattered light and other disturbing influences are filtered in this way.

The at least one compensation measure consists, for example, in an increase in the transmitted power. The transmitted power is, in particular, variable for each individual channel. The transmitted power for each channel can be regulated by a conventional automatic function such that the receivers assigned to the transmission device always receive a signal of constant intensity. Instances of contamination on the sensors, for example, are automatically compensated thereby. The power level of the transmitted power is always as low as possible in this case, in order to keep the switching sensitivity high and constant. However, this is possible only for instances of contamination that occur slowly and are continuously compensated. A rapidly occurring signal attenuation is interpreted as a switching operation, for which reason even directly incident sunlight can lead to a switching operation, as already described. If it is established by an inventive method that extraneous light is incident in the detector, this is not interpreted as a switching operation, but leads, for example, to the increasing of the transmitted power by a previously set absolute value. The detector thereby immediately receives a stronger signal in the next cycle. The signal-to-noise ratio is improved thereby. In addition, it is thereby ensured that the voltage measured at the detector output lies above the switching threshold at the end of the transmission period, as long as no obstacle is located in the beam path of the light barrier.

As soon as the disturbing light ceases, either the automatic function can correct the transmitted power to the original value in a stepwise fashion, or the light barrier can be operated in the normal mode in the next cycle so that the rise in power caused in the compensation mode is no longer carried out.

As an alternative to this, or in addition, the at least one compensation measure can also comprise raising the hysteresis. The set threshold values for switching the switching output on and off can in this case be drawn somewhat further out from one another. As a result, the hysteresis is raised and the switching output becomes less sensitive to the signal ripple. Another consequence is the avoidance of operational faults owing to the ripple because of incident extraneous light. If it is established in a following cycle that extraneous light is no longer incident on the detector, the light barrier is operated in normal mode again in the next cycle so that the threshold values for switching the switching output on and off are reset again to their original values.

By way of example, the formation of an average signal comes into consideration as further possible compensation measures. Unlike in undisturbed operation, in the case of which it is always the analog measured value at the end of the evaluation period that is used because the output voltage at the detector has then reached its highest value, it is no longer the case when extraneous light is incident. As already described, the analog measured value can then also lie below the switching threshold although no obstacle is situated in the beam path of the light barrier. If extraneous light is detected on the detector in a cycle, it is therefore possible to form an average value from a plurality of sampled values at the end of the evaluation period. If the average value from various measured radiation values is used to switch the switching output on and off, the result is not so strongly influenced by a brief random fluctuation caused by noise. Instead of using only the current measured value of the output voltage at the detector in this cycle, it is also possible to form the average value via a plurality of these measured values from the previous cycles. The influence of a brief random fluctuation is also thereby reduced. However, there is a slight increase in the total reaction time.

Particularly in the case of sporadic extraneous light, a switching delay by a few cycles can also be activated, and this likewise contributes to stabilization of the switching performance. However, this also lengthens the total reaction time.

If it is established that extraneous light is no longer incident on the detector in a cycle in which the light barrier is operated in the compensation mode, all the compensation measures are dropped again, and the light barrier is operated in the normal mode again in the next cycle.

An inventive light barrier comprises at least one transmission device and at least one detector and an electrical controller that is set up to carry out a method described above. Such a light barrier can be used to react in the short term and reliably to extraneous light incident directly on the detector, without an increase in the total reaction time of the light barrier or the occurrence of operational faults. One such light barrier is, in particular, a multichannel light barrier that comprises a plurality of transmission devices which are respectively assigned a detector. Advantageously situated upstream of each of these detectors is at least one filter that filters the incident electromagnetic radiation according to frequency and/or polarization and/or phase. Better decoupling of the detector from disturbing influences such as, for example, scattered light, is ensured in this way.

An exemplary embodiment of the present invention is explained below in more detail with the aid of a drawing, in which:

FIG. 1 is a schematic of the design of a multichannel light barrier. In the exemplary embodiment shown in FIG. 1, said light barrier comprises eight transmission devices 2 whose emitted electromagnetic radiation is received by eight detectors 4.

Figure 1:
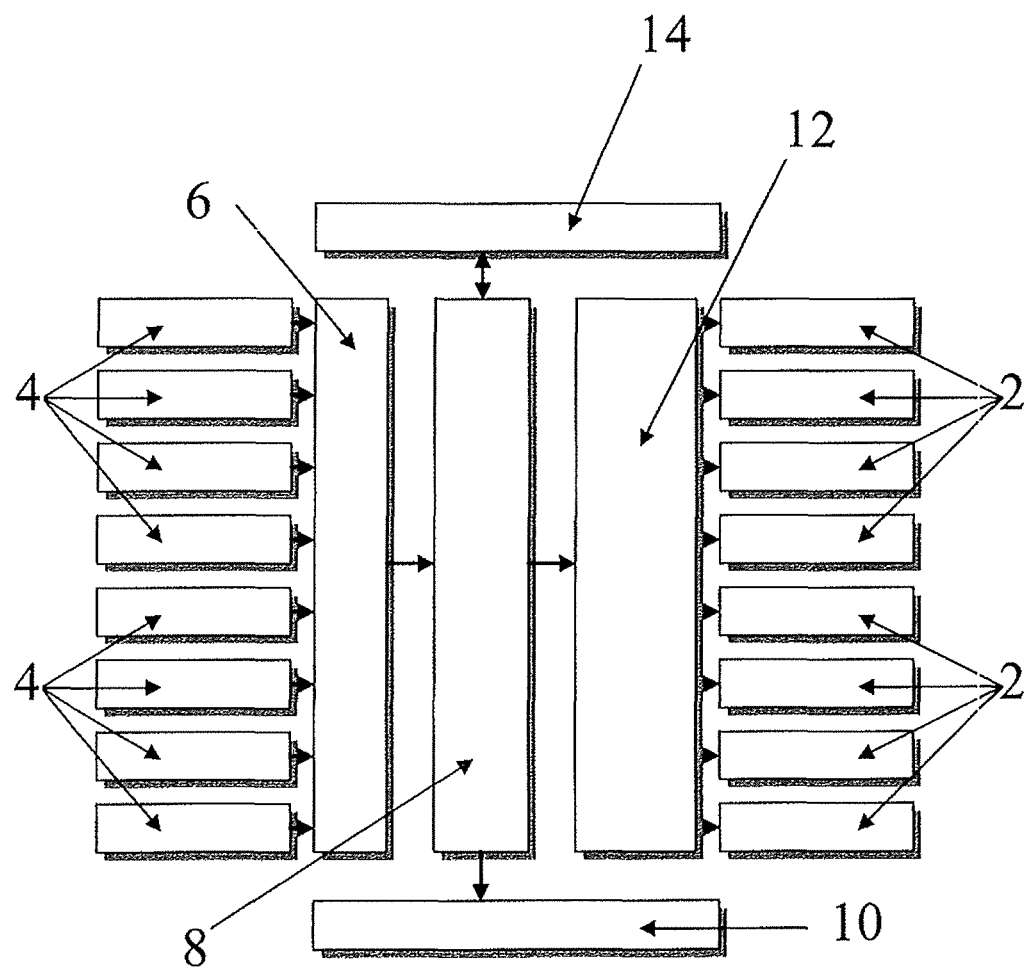
FIG. 1 is a schematic of the design of a multichannel light barrier.

A first time multiplexer 6 ensures that only one detector is ever activated, that is to say is able to pass on its signal to a signal evaluation device 8. Taking place in this signal evaluation device 8 are both the evaluation of the recorded measurement signals with reference to the presence of the incidence of extraneous light, and also the question as to whether an obstacle is or is not located in the beam path of the light barrier. The switching output 10 of the light barrier is controlled according to whether an object has, or has not, been detected in the beam path of the light barrier. If it is established that extraneous light is incident on the detector, by way of example the transmitted power of the electromagnetic radiation emitted by the transmitters 2 is varied, for example via a transmission current control 12, or some other compensation measure is taken up. It is also here that the light barrier is switched over between normal mode and compensation mode. Integrated in the transmission current control 12 is a further multiplexer, which ensures that in each case only one of the transmitters 2 is activated.

The light barrier can be operated and/or programmed via a user interface 14. In particular, by way of example, it is possible to select here which compensation measure should be used as soon as the light barrier is operating in the compensation mode.

Figure 2:
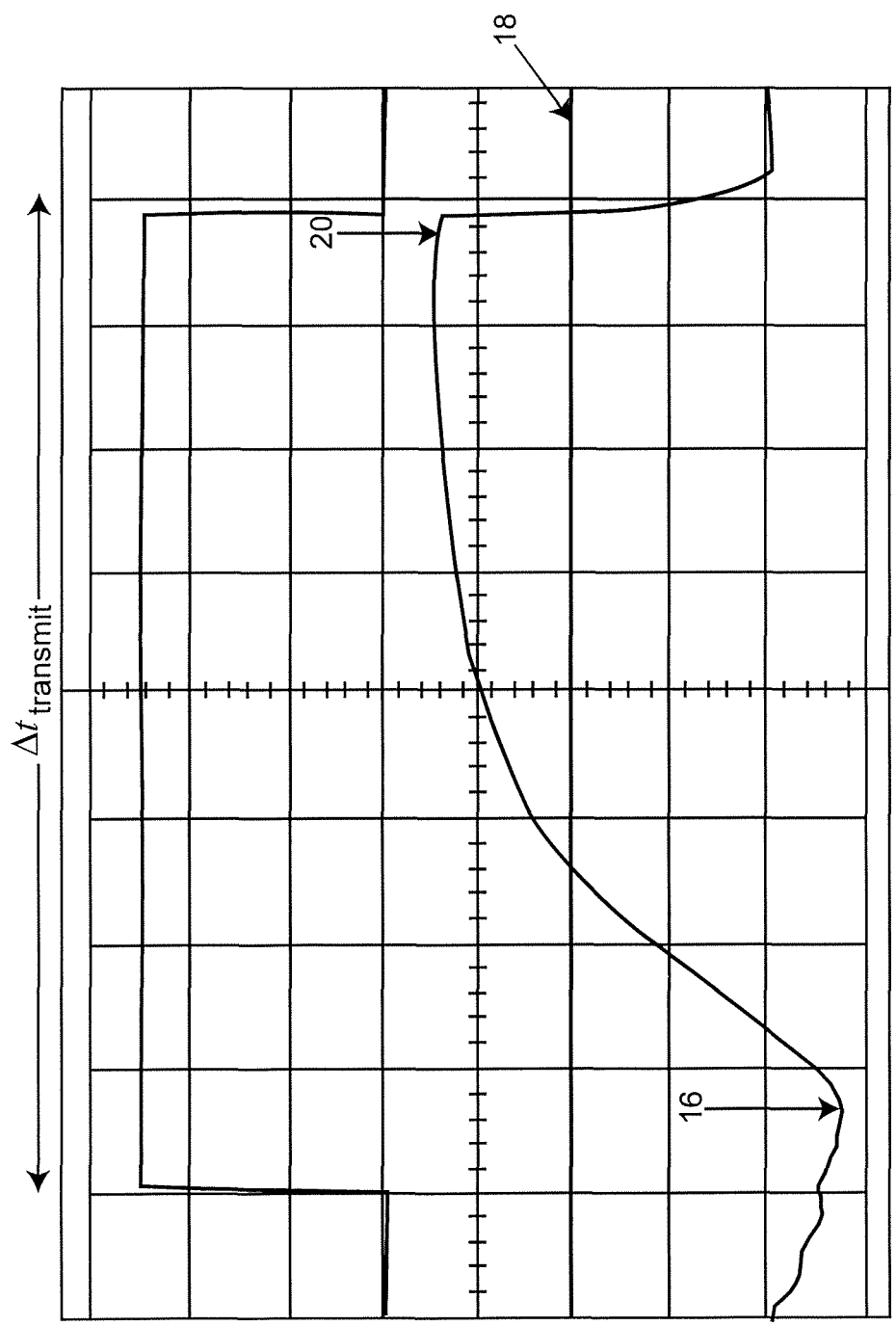
FIG. 2 shows the signal profile at the detector for an undisturbed channel.

FIG. 2 shows the signal profile at the output of a detector plotted against the evaluation period. The upper curve in this case illustrates the transmission period $\Delta t_{transmit}$ over which a transmission device 2 outputs electromagnetic radiation in the direction of the detector 4 assigned to it. The lower curve in FIG. 2 shows the voltage profile at the output of the detector 4 for an undisturbed channel. The filter voltage is set to zero at a calibration time 16, in order to ensure reproducible initial conditions, and to exclude influence being exerted by a preceding channel or a preceding cycle. The curve rises monotonically, and exceeds a switching threshold 18 so that the voltage value at the output of the detector 4 reaches a maximum value at the end of the transmission period $\Delta t_{transmit}$ at the measurement time 20. In the exemplary embodiment shown in FIG. 2, there is no obstacle located in the beam path of the light barrier.

Figure 3:
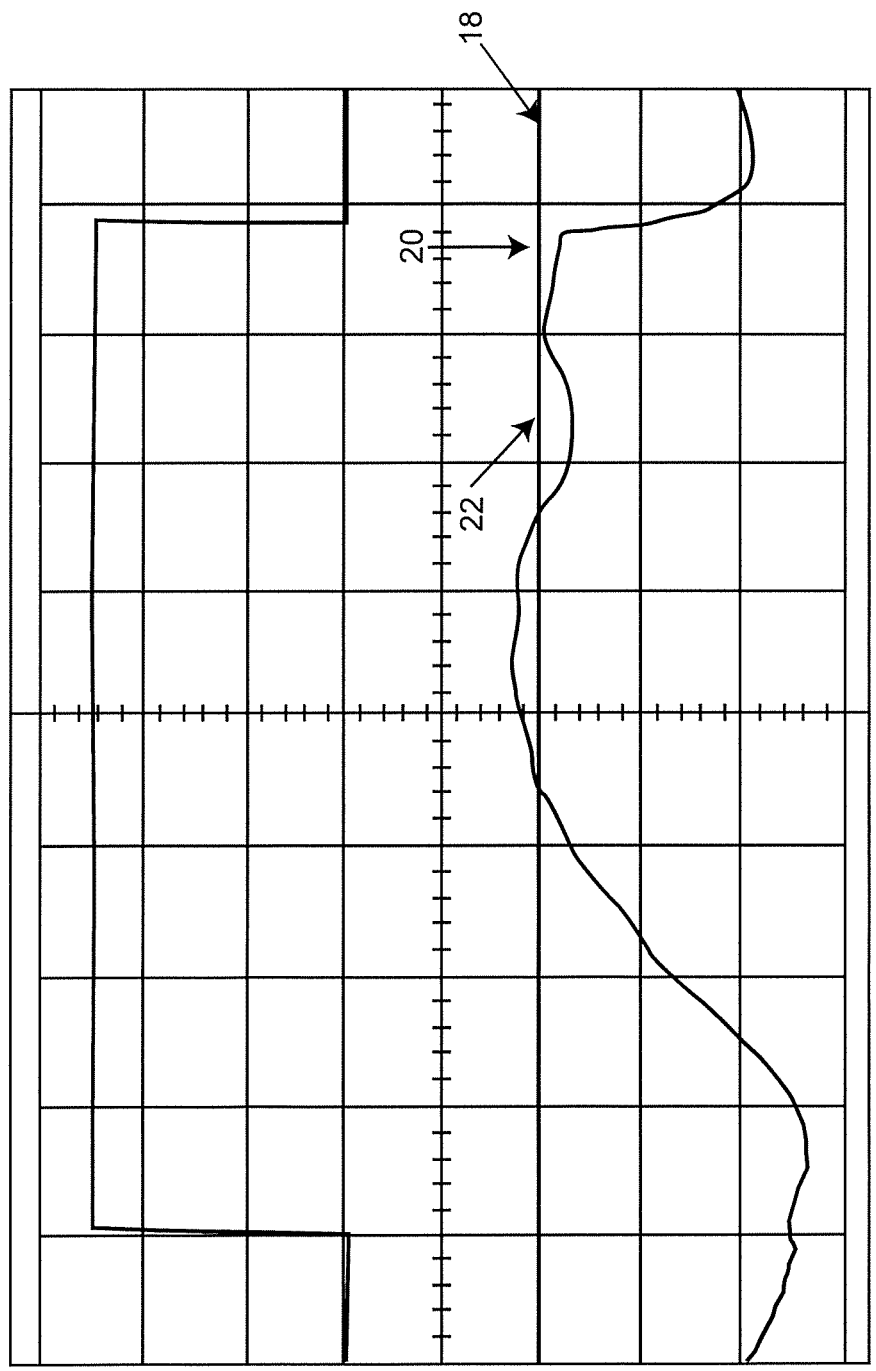
FIG. 3 shows the signal profile at the detector for a channel disturbed by extraneous light.

FIG. 3 shows the voltage profile at the output of a detector 4 in the case of a channel disturbed by incidence of extraneous light. In FIG. 3, as well, the upper curve again shows the transmission period over which a transmission device 2 emits electromagnetic radiation. It is clearly to be seen that the voltage value does not rise monotonically over the entire period, but has a pronounced ripple 22, particularly in the second part of the transmission period $\Delta t_{transmit}$.

Also in the example shown in FIG. 3, the voltage at the output of the detector 4 is measured at a measurement time 20. In this example, the measured voltage value lies below the switching threshold 18, and so it is necessary given this result to assume that an obstacle is located in the beam path of the light barrier. However, this is not the case, since the lowering of the voltage value is to be ascribed solely to the superposition of the measurement signal by the amplified noise owing to incidence of extraneous light.

Figure 4:
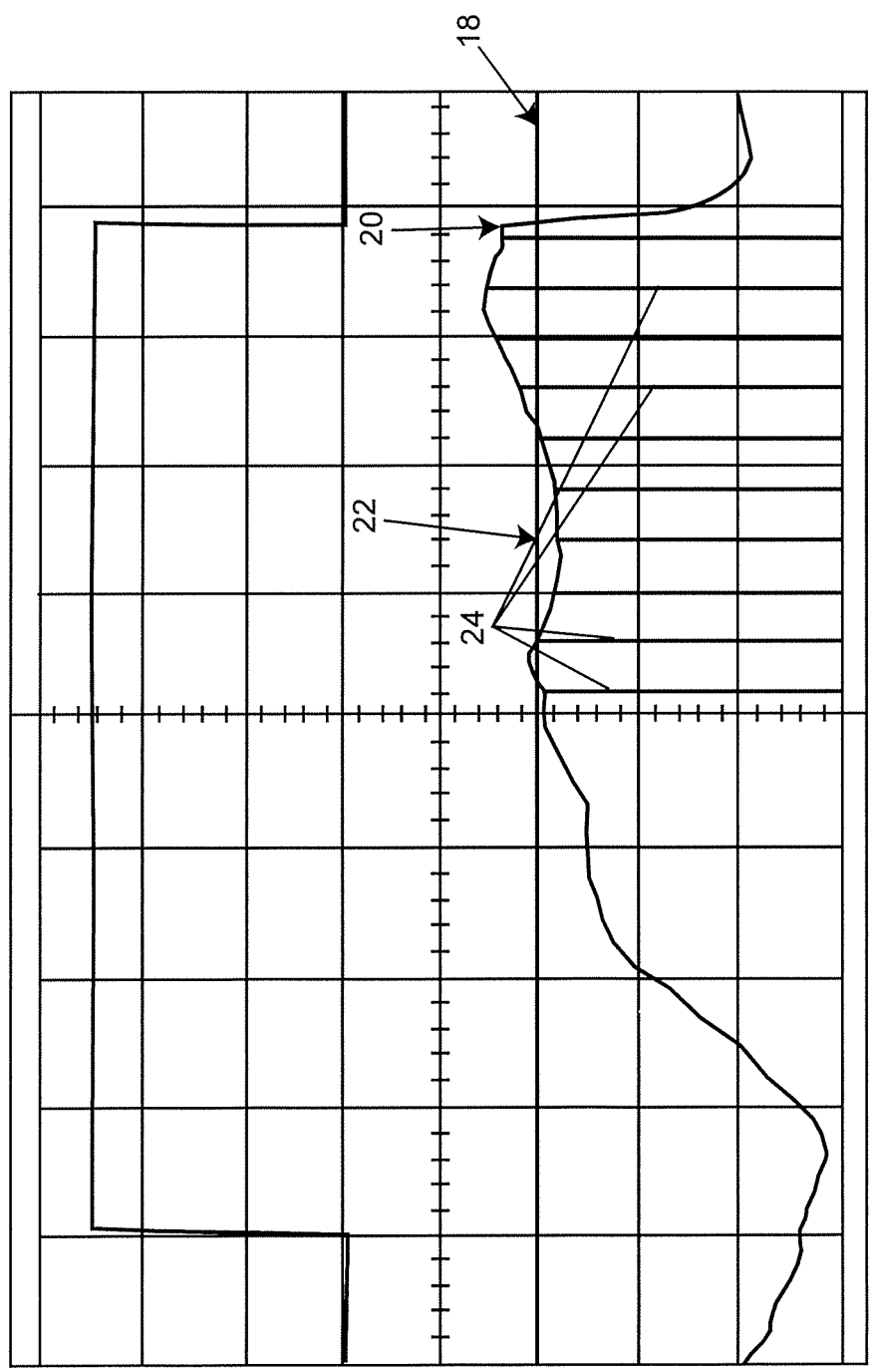
FIG. 4 is a schematic of the profile of the signal at the detector with the multiple recording of measured values in accordance with an exemplary embodiment of the present invention.

FIG. 4 shows the situation from FIG. 3 in the case of which not only is the voltage value at the output of the detector 4 measured at a measurement time 20, but a voltage value is already determined at various further measurement times 24. These measured values are used to draw a measured value curve that is then examined for the presence of a ripple 22. If such a ripple as shown in FIG. 4 is established, it is assumed that extraneous light is incident on the detector 4 so that the light barrier is switched over into the compensation mode. It is possible here to take up the compensation measures already described in order to compensate the effect of the ripple 22 on the measurement result.

LIST OF REFERENCE NUMERALS

2 Transmission device
4 Detector
6 First time multiplexer
8 Signal evaluation device
10 Switching output
12 Transmission current control and second time multiplexer
14 User interface
16 Calibration time
18 Switching threshold
20 Measurement time
22 Ripple
24 Further measurement time
Fr/ad

The invention claimed is:

1. A method for the pulsed operation of a light barrier that can be operated in a normal mode and in a compensation mode, there being run through repeatedly a cycle that comprises the following steps:
   a) transmitting electromagnetic radiation over a transmission period $\Delta t_{transmit}$ by means of a transmission device,
   b) recording measured radiation values $I_i$ of the electromagnetic radiation at various measurement times $t_{meas}$ within the transmission period $\Delta t_{transmit}$ by means of a detector, and
   c) establishing whether extraneous light is incident on the detector by examining a measured value curve of the recorded measured radiation values $I_i$, the respectively next cycle in the normal mode being run through when no extraneous light is incident, and in the compensation mode when extraneous light is incident, at least one compensation measure being carried out in the compensation mode in order to compensate the influence of extraneous light, wherein the measured value curve is examined for a positive curvature.

2. The method as claimed in claim 1, wherein a plurality of transmission devices which are respectively assigned a detector are provided, and the cycle is run through successively for each transmission device and the detector assigned to it.

3. The method as claimed in claim 1, wherein the following steps are carried out in order to examine the measured value curve for a positive curvature:
   c1) forming the measured value difference $v_i$ from in each case two measured radiation values $I_i$, $I_{i+1}$ that can be recorded at consecutive measurement times $t_{meas}$,
   c2) forming the difference $a_i$ from in each case two consecutive measured value differences $v_i$, $v_{i+1}$,
   c3) adding all the differences $a_i$ that are greater than zero to form a total A, and
   c4) comparing the total A with a predetermined limit value $A_{Limit}$.

4. The method as claimed in claim 1, wherein, before it reaches the detector, the electromagnetic radiation is filtered according to frequency and/or polarization and/or phase.

5. The method as claimed in claim 1, wherein the at least one compensation measure comprises increasing the transmitted power of the emitted electromagnetic radiation.

6. The method as claimed in claim 1, wherein the at least one compensation measure comprises raising the hysteresis.

7. A light barrier having at least one transmission device and at least one detector and an electrical controller that is set up to carry out a method as claimed in claim 1.

8. The light barrier as claimed in claim 7, wherein a plurality of transmission devices which are respectively assigned a detector are provided.

9. The light barrier as claimed in claim 7, wherein arranged upstream of each detector is at least one filter that filters the incident electromagnetic radiation according to frequency and/or polarization and/or phase.

* * * * *